United States Patent
Takemura

(10) Patent No.: US 6,530,694 B2
(45) Date of Patent: Mar. 11, 2003

(54) ROLLING BEARING UNIT

(75) Inventor: Hiromichi Takemura, Kanagawa (JP)

(73) Assignee: NSK Ltd., Tokyo (JP)

( * ) Notice: Subject to any disclaimer, the term of this patent is extended or adjusted under 35 U.S.C. 154(b) by 6 days.

(21) Appl. No.: 09/837,177

(22) Filed: Apr. 19, 2001

(65) Prior Publication Data

US 2001/0046338 A1 Nov. 29, 2001

(30) Foreign Application Priority Data

Apr. 20, 2000 (JP) ..................................... P2000-118801

(51) Int. Cl.[7] .............................................. F16C 17/24
(52) U.S. Cl. ..................................................... 384/476
(58) Field of Search ........................... 384/476; 474/90; 361/212, 216, 220

(56) References Cited

U.S. PATENT DOCUMENTS

| | | | | |
|---|---|---|---|---|
| 2,375,304 A | * | 5/1945 | Kilduff .......................... 474/90 |
| 4,623,952 A | * | 11/1986 | Pexton .......................... 361/220 |
| 5,069,559 A | * | 12/1991 | Muller et al. ................ 384/277 |
| 5,216,570 A | * | 6/1993 | Ko .............................. 361/220 |
| 5,233,499 A | * | 8/1993 | Twerdochlib ................ 361/212 |
| 5,251,081 A | * | 10/1993 | Cossette et al. .......... 360/97.02 |
| 5,716,193 A | * | 2/1998 | Mondet et al. ............. 361/218 |
| 5,804,903 A | * | 9/1998 | Fisher et al. ................ 310/219 |
| 6,142,673 A | * | 11/2000 | Kottritsch et al. .......... 384/476 |

FOREIGN PATENT DOCUMENTS

| JP | 4-160225 | 6/1992 | ........... F16C/33/62 |
|---|---|---|---|
| JP | 2540952 | 4/1997 | ........... F16C/19/52 |
| JP | 11-94704 | 4/1999 | ........... G01M/13/04 |
| JP | 11-117758 | 4/1999 | ........... F02B/77/00 |

\* cited by examiner

Primary Examiner—Thomas R. Hannon
(74) Attorney, Agent, or Firm—Sughrue Mion, PLLC

(57) ABSTRACT

Two rolling bearings 1 and 2 are respectively mounted on the two end portions of a housing 5, while the inner rings 1n and 2n thereof are mounted on a shaft 3 in such a manner that they can be rotated integrally with the shaft 3. An iron pulley 11 forming part of a drive unit 13 is fixed to the shaft 3 and is also connected to a drive source (not shown) through a power transmission belt 12. In front of the rolling bearing 1 that is closest to the drive unit 13 (specifically, on the end face of the iron pulley 11), there is disposed a diselectrification device E which is used to remove static electricity to be generated in the drive unit 13.

12 Claims, 1 Drawing Sheet

ROLLING BEARING UNIT

BACKGROUND OF THE INVENTION

1. Field of the Invention

The present invention relates to a rolling bearing unit suitable for use in a belt transmission system and a belt drive system disposed around various machine motors or a vehicle engine (for example, an alternator, an intermediate pulley, an electromagnetic clutch, a compressor and a water pump, etc.).

2. Description of the Related Art

In a rolling bearing used in the components of a rotary shaft in the vehicle or rotary shafts in various machine motors, due to the occurrence of the static electricity or the leak of the current from the electric circuit, the potential difference occurs between the inner and outer rings and therefore a current flows between them through the rolling bodies. In this case, as the contact between the rolling bodies and the inner and outer rings is the point contact or the line contact, there occurs electric discharge at the point contact or in the line contact due to large contact resistance. Accordingly, the electrolytic corrosion is occurred on the surfaces of the rolling bodies and on the raceway surfaces of the outer and inner rings, which lowers the life of the rolling bearing.

Further, around the vehicle engine, rotation is transmitted from a crankshaft through a drive pulley and a belt to a passive pulley mounted on the leading end portion of auxiliary machinery such as an alternator, an electromagnetic clutch or a compressor. In case where the drive pulley is made of iron, due to friction between the pulley, to which the high-speed rotation of the crankshaft of the engine is transmitted, and the frictional contact surface of the belt, there is generated static electricity of several hundreds volts to 5000 volts although it is discharged in part to the atmosphere. A current, which occurs due to such static electricity, for example, as disclosed in Japanese Patent Unexamined Publication No. Hei. 4-160225, flows into a rolling bearing existing close to the pulley and thus, due to the electrolytic reaction of water contained in the lubricating grease of the rolling bearing, there is generated hydrogen. This raises a problem that such hydrogen enters the interior portion of the rolling surface of the bearing, which results in the early exfoliation thereof.

In related art, as a technology for solving such problem, for example, there is known an energizing bearing which is disclosed in the registered Japanese Utility Model No. 2540952. In this bearing, there is interposed a spiral-shaped spring between the end portion of the inner peripheral surface of an outer ring and the end portion of the outer peripheral surface of an inner ring that is opposed to the end portion of the inner peripheral surface of the outer ring. On one end side of the spring, there is formed an inner ring side sliding contact portion which can be slidingly contacted with the inner ring outer peripheral surface end portion. On the other end side of the spring, there is formed an outer ring side sliding contact portion which can be slidingly contacted with the outer ring inner peripheral surface end portion. The leading end portion of the outer ring side sliding contact portion is extended substantially up to the same position of the inner ring side sliding contact portion in the peripheral direction, thereby being able to prevent a discharge phenomenon which otherwise could occur between the raceways of the rolling bearing and rolling bodies.

The energizing bearing disclosed in the above-cited registered Japanese Utility Model No. 2540952 interposes the spiral-shaped spring between the rolling bodies and inner and outer rings to thereby eliminate a potential difference between them in order to be able to prevent the discharge phenomenon from occurring between the raceways of the rolling bearing and rolling bodies. However, in actual use, there is present lubricating oil between the inner ring and rolling bodies as well as between the outer ring and rolling bodies and thus there exists a clearance of several microns between them; and, therefore, the existence of a potential difference of several volts has been confirmed between them.

On the other hand, in Japanese Patent Unexamined Publication No. Hei. 11-117758, there is disclosed a member for engine electrically mounting auxiliary machinery which can prevent static electricity from flowing to the bearing side to thereby prevent the early exfoliation of the bearing due to the electrolytically produced hydrogen. However, in this structure, since an electrically insulated part formed of synthetic resin having low thermal strength is used in the drive pulley thereof, the strength of the drive pulley is not sufficient.

SUMMARY OF THE INVENTION

In view of the above, the present invention aims at eliminating the above-mentioned drawbacks found in the rolling bearing units in the related art. Accordingly, it is an object of the invention to provide a rolling bearing unit which removes static electricity occurring due to the rotation friction of a drive unit in front of the rolling bearing to thereby be able to prevent the early exfoliation of the rolling bearing.

In attaining the above object, according to a first object of the invention, there is provided a rolling bearing unit which a rolling bearing having an inner ring and an outer ring, one of the inner and outer rings supported by a support member, the other of the inner and outer rings supporting a rotary member rotatably, a drive unit for driving and rotating the rotary member, and a diselectrification member disposed in front of the rolling bearing that is disposed closest to the drive unit in an axial direction of the rotary member, for removing static electricity to be generated form the drive unit.

Here, the drive unit can comprises a pulley mounted on the rotary member and a belt for driving the pulley. The diselectrification member can comprise a contact type diselectrification device interposed between the above pulley and ground.

Also, the rolling bearing unit can be applied to the vehicle alternator.

In the rolling bearing unit according to the invention, static electricity to be generated due to rotational friction between the pulley and drive belt forming the drive unit is removed by the contact type diselectrification member interposed between the pulley and ground to thereby control a potential difference between the rotating and fixed rings of the rolling bearing down to 1 V or less so as to be able to control the electrolytic reaction of water contained in the grease of the bearing and thus prevent generation of hydrogen ions. Thus, the early exfoliation of the bearing can be prevented and thus the life of the bearing can be enhanced.

DETAILED DESCRIPTION OF THE PREFERRED EMBODIMENT

Figure 1:
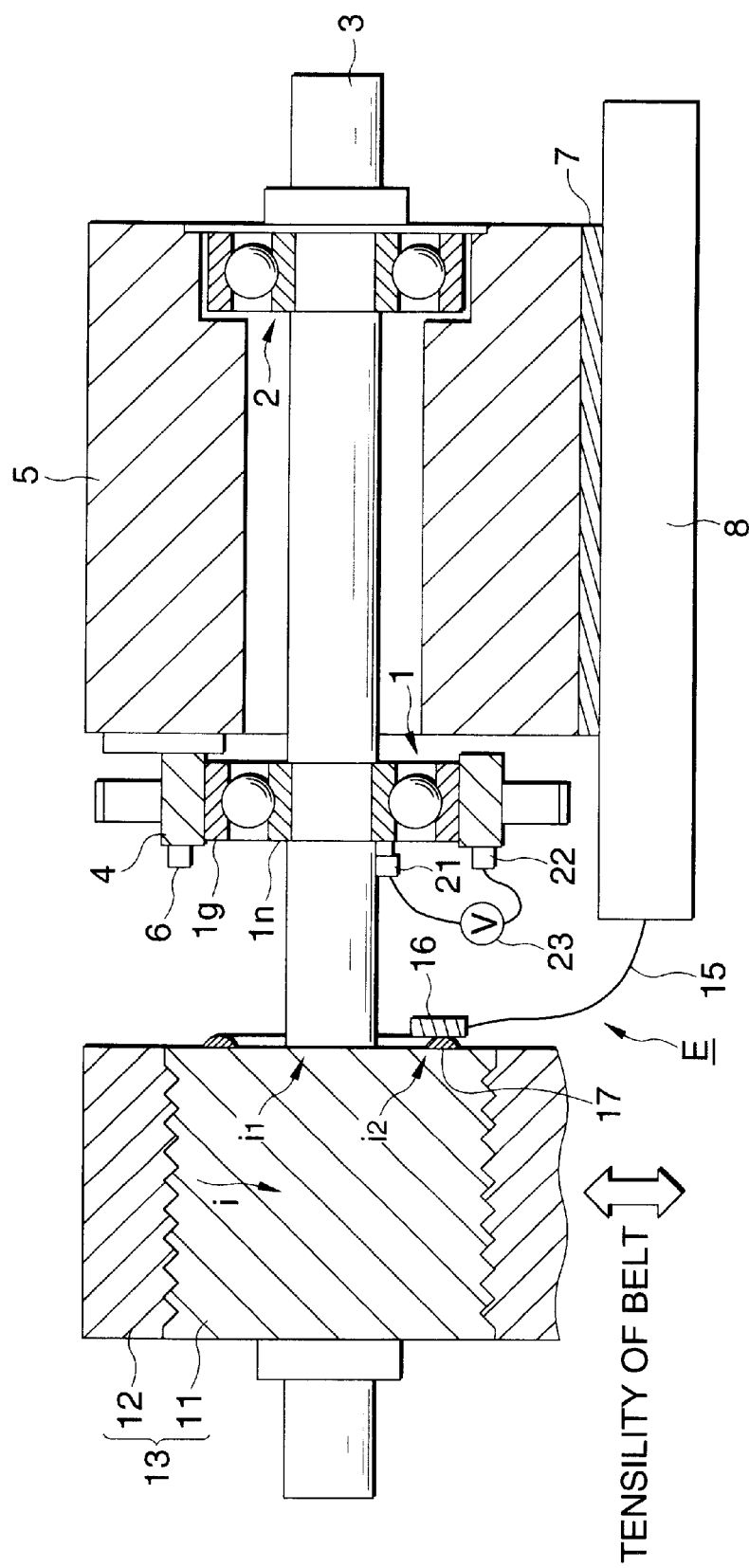
FIG. 1 is a schematic view of a bearing unit having a diselectrification device according to the invention.

Now, description will be given below of an embodiment of a rolling bearing unit according to the invention with reference to the accompanying drawings.

FIG. 1 is a schematic view of an embodiment of an inner ring rotation type of rolling bearing unit for an alternator in which diselectrification member according to the invention is incorporated in a drive unit thereof.

Two rolling bearings 1 and 2 are disposed with a clearance between them in the axial direction of the rolling bearing unit. An inner ring 1n of the rolling bearing 1 is fitted with and mounted on a shaft 3 serving as a common support member in such a manner that the inner ring 1n can be rotated integrally with the shaft 3. An outer ring 1g of the rolling bearing 1 is fitted into, and fixed to and held by a subordinate aluminum housing 4. The subordinate aluminum housing 4 is prevented against rotation by striking a plurality of fixing pins 6 into the end face of a main aluminum housing 5. On the outer peripheral surface of the main aluminum housing 5, there is mounted a ground 8 through an insulated member 7.

On the shaft 3, with a slight clearance in the outward direction of the rolling bearing, there are further integrally mounted an iron pulley 11 and a V-groove belt 12 to thereby form a drive unit 13. This drive unit 13 is connected to a drive source (not shown).

The iron pulley 11 and ground 8 are connected together by a contact type diselectrification member E. That is, the present diselectrification member (which is hereinafter referred to as an diselectrification device) E includes a spring member 15 made of beryllium copper alloy, and a fixed contact piece 16 made of beryllium copper alloy and fixed to the leading end of the spring member 15. The terminal end of the spring member 15 is fixed to the ground 8. The fixed contact piece 16 fixed to the leading end of the spring member 15 can be pressure contacted with a rotary contact piece 17 having a semispherical-shaped section due to the elastic force of the spring member 15. The rotary contact piece 17 is projectingly provided on the side surface of the iron pulley 11. In this case, as the contact pressure between the fixed contact piece 16 and rotary contact piece 17 increases, the diselectrification action thereof increases. On the other hand, in case where the contact surface roughness of the two contact pieces 16 and 17 increases, the diselectrification action thereof decreases.

Now, description will be given below of the operation and effects of the above-mentioned rolling bearing unit for an alternator with reference to the following comparison test.

Especially, in the case of the alternator, when compared with other auxiliary machinery such as an intermediate pulley, an electromagnetic clutch, or a compressor, the rolling bearing unit is used in a severe condition: that is, it can be exposed to high temperatures, high vibrations and high loads; and, since the housing thereof is made of aluminum alloy, the rolling bearing is easy to deform and is thus easy to exfoliate. Therefore, in the present comparison test, while using the rolling bearing unit for an alternator shown in FIG. 1 as the test apparatus, two cases were checked. In one case, the diselectrification device E is provided and the pressing loads of the contact pieces (16, 17) thereof are varied; and, in the other case, the diselectrification device E is not provided. Specifically, both cases were checked for the generated potential differences, the bearing life of the bearing 1 used as the test sample, and the presence or absence of exfoliation. By the way, the bearing 2 was treated only as a support bearing.

In FIG. 1, the drive unit 13 is a static electricity generating source, in which there is generated static electricity (current) i due to friction between the iron pulley 11 and transmission (V-groove) belt 12. In case where the test apparatus includes the diselectrification device E, the current (static electricity) i is divided into a current $i_1$ and a current $i_2$. The current $i_1$ flows from the iron pulley 11 directly to the shaft 3 made of iron, whereas the current $i_2$ flows through the diselectrification device E. The current $i_2$ is grounded and, therefore, $i_2 > i_1$. On the other hand, in case where the test apparatus does not include the diselectrification device E, the generated static electricity i=current $i_1$, so that all of the current flows through the shaft 3 to the test bearing 1.

The potential difference between the inner ring 1n and outer ring 1g of the test bearing 1 was measured using a potential difference meter 23 which is connected between a fixed contact piece 21 pressure contacted by a spring to the end face of the rotating inner ring 1n and a fixed contact piece 22 mounted on the end face of the fixedly supported outer ring 1g.

Test Method:

There was employed an acceleration & deceleration test method in which the number of rotations is switched over to 5000 rpm and 10000 rpm every given time (for example, every 9 seconds). When the static electricity of the surface of the transmission belt 12 rotating under this condition was measured using a no-contact type static electricity meter (manufactured by Schicom, FMX-002), there was detected static electricity of 300–1000 volts. The temperature during the test was 20° C. and the humidity was 50%.

Specifically, under this condition, embodiments 1–4 and comparison examples 1–3 were tested. As the test bearing 1, there was used JIS nominal number 6303. The load condition was set such that P (load) / C (dynamic rated load)=0.11; and, as the grease to be supplied into the test samples, there was used E grease. The calculated life of the bearing at the then time is 1670 hours and, therefore, the test finishing time was set for 2000 hours. Referring to the test number n, 10 test pieces were used for all of the embodiments and comparison examples.

The presence or absence of the diselectrification device E in the respective test samples as well as the potential differences between the rotating ring and fixed ring were set in the following manner:

Comparison Example 1

The diselectrification device E is not used. In this case, while the inner ring in of the test bearing 1 was assumed to be positive and the outer ring 1g (fixed ring) was assumed negative, when the potential difference between them was measured, it was confirmed that the potential difference was 5 V.

Comparison Example 2

The diselectrification device E is not used. In this case, using a dc voltage generating device, the outer ring 1g was set negative and a dc voltage was applied to the outer ring 1g, so that the potential difference between the rotating ring and fixed ring was 10 V.

Embodiments 1–4 and Comparison Examples 3

They respectively include the diselectrification device E. In these cases, while the pressing loads of the contact pieces (16, 17) in the diselectrification device E were varied every test to thereby vary diselectrification voltage, so that the potential difference between the rotating ring and fixed ring was varied.

The results of the test are shown in Table 1.

TABLE 1

| | Potential Difference between Rotating and Fixed Rings (V) | $L_{10}$ Life (hr) | Presence or Absence of Exfoliation |
|---|---|---|---|
| Embodiment 1 | 1.0 | 1718 | 3/10 Outer ring exfoliation |
| Embodiment 2 | 0.5 | 2000 | No exfoliation |
| Embodiment 3 | 0.2 | 2000 | No exfoliation |
| Embodiment 4 | 0.1 | 2000 | No exfoliation |
| Comparison Example 1 | 5 | 341 | 10/10 Outer ring exfoliation |
| Comparison Example 2 | 10 | 159 | 10/10 Outer ring exfoliation |
| Comparison Example 3 | 2 | 534 | 10/10 Outer ring exfoliation |

In the embodiment 1, the potential difference between the rotating and fixed rings was 1.0 V. Thus, when the hydrogen density of the component (outer ring 1g) of the rolling bearing after the rotation test was measured using the "rolling bearing lubricant evaluation method" disclosed in Japanese Patent Unexamined Publication No. Hei. 11-94704, it could be confirmed that the increment of the hydrogen density was 0.2 ppm. Although, out of the 10 test samples, eight test samples produced outer ring exfoliation due to the hydrogen increment, the $L_{10}$ life was 1718 hrs., which is longer than the calculated life (1670 hrs.).

In the embodiments 2, 3 and 4, because the potential differences between the rotating and fixed rings were respectively 0.5 V, 0.2 V, and 0.1 V, when the hydrogen density was measured, no increment in hydrogen was found; and, even at the finishing time of 2000 hrs., no exfoliation was caused.

In the comparison example 1, since the potential difference was large, namely, 5 V, exfoliation was caused in the outer rings of all of ten test samples and the hydrogen density measured value rose up to 0.3 ppm. Also, the $L_{10}$ life was 341 hrs., which is approx. ⅕ of the calculated life time.

In the comparison example 2, since the voltage thereof was increased using the do voltage generating device so that the potential difference was 10 V, exfoliation was caused in the outer rings of all of ten test samples and the hydrogen density measured value rose up to 0.4 ppm. Also, the $L_{10}$ life was 159 hrs., which is approx. ¹⁄₁₀ of the calculated life time.

In the comparison example 3, although there was used the diselectrification device, the pressing loads of the fixed and rotating terminals were small and thus the electricity could not be removed sufficiently, so that the potential difference between the rotating and fixed rings was 2 V. Therefore, exfoliation was caused in the outer rings of all of ten test samples and the hydrogen density measured value was 0.25 ppm. Also, the $L_{10}$ life was 534 hrs., which is approx. ⅓ of the calculated life time.

The above-mentioned test results show clearly that, in the rolling bearing unit for an alternator, in case where an diselectrification device is disposed in a pulley of a drive unit. Using the diselectrification device, static electricity to be generated in the pulley during operation is removed to thereby set the potential difference between the rotating and fixed rings at 1 V or less, the life of the rolling bearing as a unit can be enhanced.

By the way, although, in the above-mentioned embodiment, description has been given of the rolling bearing unit of an inner ring rotating type, the invention is not limited to this but, for example, also in the case of a rolling bearing unit of an outer ring rotating type such as a rolling bearing unit for an intermediate pulley mounted around the vehicle engine auxiliary machinery, by mounting a grounding terminal on the pulley to thereby remove electricity, there can be obtained similar effects to the rolling bearing unit of an inner ring rotating type.

Also, in the above-mentioned embodiment, description has been given of the structure in which the shaft 3 fitted with the inner ring 1n is used as the support member of the rolling bearing. However, this is not limitative but the invention can also apply to a structure in which the support member supports the outer ring 1g in a rotatable manner (for example, in the case of the intermediate pulley, the rolling bearing is fitted with the central portion of the pulley main body and the pulley main body serves as the support member of the bearing).

Further, in the above-mentioned embodiment, description has been given of the structure in which the fixed contact piece 16 is fixed to the leading end of the spring member 15, and the terminal end of the spring member 15 is fixed to the ground 8. However, this is not limitative but the invention can also apply to a structure in which the fixed contact piece 16 is fixed to the terminal end of the spring member 15, the leading end of the spring member 15 is fixed to the iron pulley 11, and the fixed contact piece 16 can be pressure contacted with the contact piece 17 provided on the side surface of the ground 8 due to the elastic force of the spring member 15.

As has been described heretofore, according to the invention, since static electricity of several hundreds volts to several thousands volts to be generated in a drive unit, which supports the rotating ring of a rolling bearing and drives the same rotationally, is removed using diselectrification member disposed in contact with the drive unit, the potential difference between the rotating and fixed rings can be reduced to thereby prevent the current from flowing into the rolling bearing. As a result of this, the early exfoliation of the rolling bearing can be prevented and thus the life of the rolling bearing unit can be enhanced.

What is claimed is:

1. A rolling bearing unit comprising:
   a rolling bearing including an inner ring and an outer ring, one of the inner and outer rings being supported by a support member, the other of the inner and outer rings supporting a rotary member rotatably;
   a drive unit for driving and rotating the rotary member; and
   a diselectrification member connected with the drive unit, for removing static electricity to be generated from said drive unit, wherein said diselectrification member is provided between said drive unit and said rolling bearing which is nearest said drive unit.

2. The rolling bearing unit as set forth in claim 1, wherein a plurality of rolling bearings are provided in said rolling bearing unit, and said diselectrification member is disposed between the rolling bearing being nearest from said drive unit and said drive unit.

3. The rolling bearing unit as set forth in claim 2, wherein said rolling bearing unit is applied for use in a vehicle engine auxiliary machinery.

4. The rolling bearing unit as set forth in claim 1, wherein a potential difference between said inner ring and said outer ring is set at 1 V or less.

5. The rolling bearing unit as set forth in claim 1, wherein said rolling bearing unit is applied for use in a vehicle engine auxiliary machinery.

6. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein the support member is mounted on a grounding member through an insulated member.

7. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein a plurality of rolling bearings are provided in said rolling bearing unit, and said diselectrification member is disposed between the rolling bearing being nearest from said drive unit and said drive unit, and further wherein the support member is mounted on a grounding member through an insulated member.

8. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein said diselectrification member is disposed between said rolling bearing and said drive unit, and further wherein the support member is mounted on a grounding member through an insulated member.

9. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein said diselectrification member comprises a contact piece being contacted with said drive unit or a grounding member, and an elastic member for energizing said contact piece against said drive unit or the grounding member, said elastic member connected to the contact piece in one end thereof and connected to the grounding member or said drive unit in the other end thereof.

10. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein a plurality of rolling bearings are provided in said rolling bearing unit, and said diselectrification member is disposed between the rolling bearing being nearest from said drive unit and said drive unit, and further wherein said diselectrification member comprises a contact piece being contacted with said drive unit or a grounding member, and an elastic member for energizing said contact piece against said drive unit or the grounding member, said elastic member connected to the contact piece in one end thereof and connected to the grounding member or said drive unit in the other end thereof.

11. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein said diselectrification member is disposed between said rolling bearing and said drive unit, and further wherein said diselectrification member comprises a contact piece being contacted with said drive unit or a grounding member, and an elastic member for energizing said contact piece against said drive unit or the grounding member, said elastic member connected to the contact piece in one end thereof and connected to the grounding member or said drive unit in the other end thereof.

12. A rolling bearing unit comprising:

a rolling bearing including an inner ring and an outer ring, one of the inner and outer rings being supported by a support member, the other of the inner and outer rings supporting a rotary member rotatably;

a drive unit for driving and rotating the rotary member; and a diselectrification member connected with the drive unit, for removing static electricity to be generated from said drive unit, wherein said diselectrification member comprises a rotary contact piece provided on said drive unit, a fixed contact piece pressure contacted with the rotary contact piece, and an elastic member fixed to the fixed contact piece at one end thereof and fixed to a grounding member at the other end thereof, for energizing the fixed contact piece against the rotary contact piece.

* * * * *